US006998078B2

(12) United States Patent
Wierer et al.

(10) Patent No.: US 6,998,078 B2
(45) Date of Patent: Feb. 14, 2006

(54) PROCESS FOR PRODUCING WOOD PARTICLEBOARD

(75) Inventors: Konrad Alfons Wierer, Burghausen (DE); Abdulmajid Hashemzadeh, Burgkirchen (DE); Klaus Marquardt, Burghausen (DE)

(73) Assignee: Wacker Polymer Systems GmbH & Co. KG, Munich (DE)

( * ) Notice: Subject to any disclaimer, the term of this patent is extended or adjusted under 35 U.S.C. 154(b) by 952 days.

(21) Appl. No.: 10/004,096

(22) Filed: Oct. 31, 2001

(65) Prior Publication Data

US 2002/0074096 A1 Jun. 20, 2002

(30) Foreign Application Priority Data

Nov. 2, 2000 (DE) ........................................ 100 54 163

(51) Int. Cl.
*C04B 40/00* (2006.01)
*B29C 59/00* (2006.01)
*B29C 67/24* (2006.01)

(52) U.S. Cl. .......................... 264/83; 264/118; 264/123

(58) Field of Classification Search ................... 264/83, 264/118, 123
See application file for complete search history.

(56) References Cited

U.S. PATENT DOCUMENTS 6,599,455 B1 * 7/2003 Wierer et al. ............... 264/118

FOREIGN PATENT DOCUMENTS

| | | |
|---|---|---|
| DE | 43 16 498 A1 | 11/1994 |
| DE | 195 11 130 A1 | 10/1996 |
| DE | 196 06 393 A1 | 8/1997 |
| DE | 196 18 271 A1 | 11/1997 |
| DE | 197 29 161 A1 | 1/1999 |
| WO | WO 83/04387 | 12/1983 |
| WO | WO 97/28935 | 8/1997 |
| WO | WO 97/31059 | 8/1997 |
| WO | WO 97/45461 | 12/1997 |
| WO | WO 99/02591 | 1/1999 |
| WO | WO 99/09100 | 2/1999 |

OTHER PUBLICATIONS

Derwent Abstract Corresponding To WO 97/31059 [AN 1997–435120].
Derwent Abstract Corresponding To WO 99/02591 [AN 1999–082379].
Derwent Abstract Corresponding To WO 97/45461 [AN 1998–019768].
Deppe, Ernst, Taschenbuch der Spanplattentechnik, 3rd edition, 1991.
Derwent Abstract Corresponding To WO 99/09100 [AN 1999–154860].
Derwent Abstract Corresponding To DE 197 29 161 [AN 1999–082379].
Derwent Abstract Corresponding To ED 196 18 271 [AN 1997–551224].
Derwent Abstract Corresponding To DE 196 06 393 [AN 1997–435120].
Derwent Abstract Corresponding To DE 195 11 130 [AN 1996–435561].
Derwent Abstract Corresponding To DE 43 16 498 [AN 1995–000294].
Chem. Abstr. 122 (1994) 109068.
Derwent Abstract Corresponding To JP 620 27 107 [AN 1987–075307].
Derwent Abstract Corresponding To WO 97/28935 [AN 1997–415153].

* cited by examiner

*Primary Examiner*—Stephen J. Lechert, Jr.
(74) *Attorney, Agent, or Firm*—Brooks Kushman P.C.

(57) ABSTRACT

The invention relates to a process for producing wood fiberboard by pressing wood fibers which have been treated with binder, in which the wood fibers are boiled and milled at elevated temperature under steam pressure in a refiner unit, subsequently are transferred to a blow-line, then dried and finally pressed under pressure and, if desired, at elevated temperature to produce boards, wherein the treatment with binder is carried out using a multi-component binder, preferably with one component A) containing functional groups which are nonreactive at elevated temperature and a second component B) containing functional groups which are reactive at elevated temperature the component A) being added in the refiner unit at a temperature of from 120° C. to 200° C. prior to the milling step, during the milling step, or shortly after the milling step in the front section of the blow-line and component B) being added at a lower temperature of not more than 150° C. at the end of the blow-line or during or after the drying of the wood fibers.

19 Claims, No Drawings

PROCESS FOR PRODUCING WOOD PARTICLEBOARD

BACKGROUND OF THE INVENTION

1. Field of the Invention

The invention relates to a process for producing wood particleboard by pressing wood particles which have been treated with binder, in which the wood particles are boiled and milled at elevated temperature under steam pressure in a refiner unit, and subsequently fluidized in a stream of steam in a blow-line, then dried and pressed under pressure and, if desired, at elevated temperature, to produce boards.

2. Background Art

To produce wood particleboard, the wood particles, for example wood fibers or wood chips, are glued together by means of an organic adhesive under pressure and at elevated temperature. The most important binders for fiberboard production are urea-formaldehyde resins (UF resins). To produce moisture-resistant wood chipboards, phenol-formaldehyde resins (PF resins) are of great importance. Melamine-formaldehyde resins (MF resins) are also used for improving the moisture resistance of wood particleboard. A disadvantage of these adhesives is that formaldehyde is emitted both during production of the particleboard and during use of the finished, pressed particleboard. A further disadvantage of these reactive resins becomes apparent in the production of MD and HD fiberboard: in the production of medium density fiberboard (MDF) and high density fiberboard (HDF), the fibers are hydrothermally pretreated in a first step in a refiner unit, i.e. boiled and milled at elevated temperature under steam pressure. After milling, the fibers, while still under steam pressure and at temperatures from 120° C. to 150° C., are treated with binder by spraying an aqueous dispersion of the binder via a cooled valve into the blow-line. The turbulence which occurs at a flow velocity of from 200 to 500 m/s distributes the binder uniformly over the fiber surface. Finally, the fibers which are treated with binder are dried, laid down uniformly, and pressed at temperatures of from 150 to 250° C. to produce boards. A problem is that during the treatment with binder in this process, the reactive resins react in the blow-line as a result of the elevated temperature, resulting in a loss of up to 25% of their binding potential during pressing.

Formaldehyde-free, thermally curable, aqueous binders for producing wood particleboard are known, for example, from WO-A 97/31059. In this publication, a mixture of carboxyl-functional copolymer and an alkanolamine having at least two hydroxy groups is used. Aqueous adhesive compositions comprising polycarboxylic acid and hydroxyalkyl-substituted aminoaliphatics are described in WO-A 97/45461. WO-A 99/02591 relates to compositions comprising a carboxyl-functional copolymer and long-chain amines. A disadvantage of these systems, which crosslink via an esterification reaction, is that crosslinking occurs only in the water-free state, on drying.

SUMMARY OF THE INVENTION

It is an object of the invention to provide a process for producing wood particleboard in which premature reaction of functional groups is largely prevented and the emission of pollutants such as formaldehyde is avoided but high-quality bonding is nevertheless obtained. These and other objects are achieved by the use of a two component binding system in which a first binder component is admixed with wood particles during an early phase of the process, and a second binder component, reactive with the first, is added subsequently at lower temperature.

DETAILED DESCRIPTION OF THE PREFERRED EMBODIMENT(S)

The invention provides a process for producing wood fiberboards by pressing wood fibers which have been treated with binder, in which the wood fibers are boiled and milled at elevated temperature under steam pressure in a refiner unit, subsequently are transferred to a blow-line, then dried and finally pressed under pressure and, if desired, at elevated temperature to produce boards. In a preferred embodiment, the treatment with binder is carried out using a two-component binder, with the one component A) containing functional groups which are nonreactive at elevated temperature and the second component B) containing functional groups which are reactive at elevated temperature, the component A) added in the refiner unit at a temperature of from 120° C. to 200° C. prior to the milling step, during the milling step or shortly after the milling step in the front section of the blow-line, and the component B) added at a lower temperature of not more than 150° C. at the end of the blow-line or during or after the drying of the wood fibers.

Suitable two-component binders preferably comprise, as component A), a copolymer comprising one or more comonomer units selected from the group consisting of vinyl esters of unbranched or branched alkylcarboxylic acids having from 1 to 18 carbon atoms, acrylic esters and methacrylic esters of branched or unbranched alcohols having from 1 to 15 carbon atoms, dienes, olefins, vinylaromatics and vinyl halides and from 0.1 to 50% by weight, based on the total weight of the copolymer, of one or more units containing carboxyl, hydroxy or NH groups.

Suitable carboxyl-functional comonomers for copolymer A) are ethylenically unsaturated monocarboxylic and dicarboxylic acids, preferably acrylic acid, methacrylic acid, crotonic acid, itaconic acid, fumaric acid and maleic acid. The carboxyl function can also be introduced into the copolymer A) by copolymerization of maleic anhydride. Suitable hydroxy-functional comonomers are hydroxyalkyl acrylates and hydroxyalkyl methacrylates having a $C_1$–$C_8$-alkyl radical, preferably hydroxyethyl acrylate and methacrylate, hydroxypropyl acrylate and methacrylate, and hydroxybutyl acrylate and methacrylate. Suitable NH-functional comonomers are (meth)acrylamide, diacetoneacrylamide, maleimide, amides of monoalkyl maleates and fumarates, diamides of maleic and fumaric acids, amides of monovinyl glutarates and succinates, and amides of monoallyl glutarates and succinates. The NH-functional units can also be introduced into the copolymer A) as aminofunctional oligomers containing primary or secondary NH groups, preferably ones containing primary NH groups such as Jeffamine® amine. The proportion of functional units in copolymer A) is preferably from 1 to 30% by weight, particularly preferably from 5 to 20% by weight, in each case based on the total weight of the copolymer. By "functional units" is meant the entire monomer or monomers containing the functional groups, not merely the functional group itself.

Preference is given to the following base polymer compositions for the copolymer A) which, of course, also contains the abovementioned functional group-containing units in the amounts described above: vinyl acetate polymers; vinyl ester-ethylene copolymers such as vinyl acetate-ethylene copolymers; vinyl ester-ethylene-vinyl chloride copolymers in which the vinyl esters present are preferably vinyl acetate and/or vinyl propionate and/or one or more copolymerizable vinyl esters such as vinyl laurate, vinyl pivalate, vinyl 2-ethylhexanoate, vinyl esters of alpha-branched carboxylic acids having from 5 to 11 carbon atoms, in particular vinyl esters of Versatic acid, i.e. VeoVa9$^R$ and VeoVa10$^R$ available from Shell; vinyl acetate copolymers with one or more copolymerizable vinyl esters such as vinyl laurate, vinyl pivalate, vinyl 2-ethylhexanoate, vinyl esters of alpha-branched carboxylic acids having from 5 to 11 carbon atoms, in particular vinyl esters of Versatic acid (VeoVa9$^R$, VeoVa10$^R$), which may further comprise ethylene; vinyl ester-acrylic ester copolymers, in particular with vinyl acetate and butyl acrylate and/or 2-ethylhexyl acrylate, which may further comprise ethylene; and vinyl ester-acrylic ester copolymers with vinyl acetate and/or vinyl laurate and/or vinyl esters of Versatic acid and acrylic esters, in particular butyl acrylate or 2-ethylhexyl acrylate, which may further comprise ethylene.

Particular preference is given to (meth)acrylic ester polymers and styrene polymers, for example, copolymers with n-butyl acrylate and/or 2-ethylhexyl acrylate; copolymers of methyl methacrylate with butyl acrylate and/or 2-ethylhexyl acrylate and/or 1,3-butadiene; styrene-1,3-butadiene copolymers, and styrene-(meth)acrylic ester copolymers such as styrene-butyl acrylate, styrene-methyl methacrylate-butyl acrylate or styrene-2-ethylhexyl acrylate, where n-, iso- and t-butyl acrylate can be used as butyl acrylate.

Most preferred are compositions containing a carboxyl-functional styrene-n-butyl acrylate copolymer and/or a carboxyl-functional styrene-methyl methacrylate-n-butyl acrylate copolymer as copolymer A).

Further possible components A) are polyester or polyether resins containing hydroxyl, amino or carboxyl groups.

Suitable crosslinkers which may be used as component B) are non-thermoplastic compounds such as epoxide crosslinkers of the bisphenol A type, i.e. condensation products of bisphenol A and epichlorohydrin or methylepichlorohydrin. Such epoxide crosslinkers are commercially available, for example under the trade names Epicote and Eurepox. Also suitable are blocked or unblocked diisocyanates, oligoisocyanates or polyisocyanates, for example customary commercial products such as m-tetramethylxylene diisocyanate (TMXDI), methylene-diphenyl diisocyanate (MDI), tolylene diisocyanate, isophorone diisocyanate, dimethylmeta-isopropenylbenzyl isocyanate. Suitable crosslinkers B) also include compounds containing two or more groups selected from the group consisting of aldehyde, keto and reactive CH groups, e.g. glutaraldehyde, terephthaldialdehyde; bisacetoacetates of ethylene glycol, propylene glycol, butylene glycol, hexadiene glycol; and compounds containing a plurality of aziridine, carbodiimide or oxazoline groups.

Further suitable crosslinkers which may be used as component B) are copolymers which bear epoxy, N-methylol, ethylene carbonate or isocyanate groups or combinations of these groups. The polymer compositions for the crosslinker component B) preferably contain the same comonomers described as suitable for copolymer A). Preference is given to base polymer compositions identified as preferred for the copolymer A) which further comprise comonomer units bearing epoxy, N-methylol, ethylene carbonate and/or isocyanate groups. Particular preference is given to (meth) acrylic ester polymers and styrene polymers, for example copolymers with n-butyl acrylate and/or 2-ethylhexyl acrylate; copolymers of methyl methacrylate with butyl acrylate and/or 2-ethylhexyl acrylate and/or 1,3-butadiene; styrene-1,3-butadiene copolymers and styrene-(meth)acrylic ester copolymers such as styrene-butyl acrylate, styrene-methyl methacrylate-butyl acrylate or styrene-2-ethylhexyl acrylate, where n-, iso-, t-butyl acrylate can be used as butyl acrylate.

The content of epoxy-, N-methylol-, ethylene carbonate-, and isocyanate-functional comonomers in the copolymeric component B) is from 0.1 to 50% by weight, preferably from 1 to 30% by weight, more preferably from 5 to 20% by weight, in each case based on the total weight of the copolymer B). Suitable epoxide-functional comonomers are glycidyl acrylate, glycidyl methacrylate, allyl glycidyl ether, vinyl glycidyl ether, vinylcyclohexene oxide, limonene oxide, myrcene oxide, caryophyllene oxide, styrenes and vinyltoluenes substituted in the aromatic ring by a glycidyl group, and vinyl benzoates substituted in the aromatic ring by a glycidyl group. Suitable isocyanate-functional comonomers are 2-methyl-2-isocyanatopropyl methacrylate and isopropenyldimethylbenzyl isocyanate (TMI). Suitable N-methylol-functional comonomers are N-methylolacrylamide (NMA), N-methylolmethacrylamide, allyl N-methylcarbamate, alkyl ethers and esters such as the isobutoxy ether or ester of N-methylolacrylamide, of N-methylolmethacrylamide and of allyl N-methylcarbamate.

Suitable crosslinkers B) useful in combination with carboxyl-functional copolymers A) are diamines, oligoamines and polyamines such as diaminobutane, hexamethylenediamine, polyalkyleneamines such as triethylenetetramine, and polyoxyalkyleneamines (Jeffamine®). Further examples of suitable crosslinkers B) useful in combination with carboxyl-functional copolymers A) are compounds containing two or more OH groups, e.g. ethylene glycol, butanediol, pentaerythritol, polytetramethylene glycol, bisphenol A, and ethylene glycol and similar polyether polyols. Yet further suitable crosslinkers B) useful in combination with carboxyl-functional copolymers A) are polyvalent metal ions such as aluminum chloride, iron(III) chloride, or zinc chloride.

Suitable crosslinkers B) useful in combination with hydroxy-functional copolymers A) are compounds containing two or more silanol or alkoxysilane groups, e.g. methyltriethoxysilane, in monomeric or condensed form, and also polyvalent metal ions such as aluminum chloride, iron(III) chloride, or zinc chloride.

Suitable crosslinkers B) useful in combination with NH functional copolymers A) are dicarboxylic, oligocarboxylic and polycarboxylic acids such as adipic acid and polyacrylic acid.

In the case of the abovementioned systems with carboxyl-, hydroxy- and NH-functional copolymers A), it is also possible for the crosslinker component B) to be added together with a crosslinking catalyst. Examples of crosslinking catalysts are citric acid, oxalic acid, butanetetracarboxylic acid, quaternary phosphonium salts such as tetrabutylphosphonium salts, sodium hypophosphite, and dibutyltin dilaurate. This list is exemplary and not limiting. An alternative embodiment to the preferred process of the present invention is firstly to add the copolymer A) together with the component B) and to add the catalyst in the later If carboxyl-functional copolymers are used as component A) they can also be combined with a component B) which catalyzes the reaction of the carboxyl group with the OH groups of the cellulose. Examples of such components B) are citric acid, oxalic acid, butanetetracarboxylic acid, quaternary phosphonium salts such as tetrabutylphosphonium salts, sodium hypophosphite, and dibutyltin dilaurate.

Diamines, oligoamines and polyamines such as diaminobutane, hexamethylenediamine, polyalkyleneamines such as triethylenetetramine or polyoxyalkyleneamines (Jeffamine®) can also be used as component A), in which case the abovementioned, blocked or unblocked diisocyanates, for example m-tetramethylxylene diisocyanate (TMXDI), methylenediphenyl diisocyanate (MDI), toluene diisocyanate, isophorone diisocyanate, dimethyl-meta-isopropenylbenzyl isocyanate, may then be used as component B).

Suitable systems also include those comprising tin catalysts as component A), for example tetraalkyltin compounds such as dibutyltin dilaurate. These catalysts can be combined with blocked or unblocked diisocyanates as component B), for example m-tetramethylxylene diisocyanate (TMXDI), methylenediphenyl diisocyanate (MDI), toluene diisocyanate, isophorone diisocyanate, dimethyl-meta-isopropenylbenzyl isocyanate, and also oligoisocyanates or polyisocyanates. Further suitable components B) are dicarboxylic, oligocarboxylic, and polycarboxylic acids such as adipic acid and polyacrylic acid.

Further examples of 2-component systems are ones which lead to crosslinked polysiloxanes. Such systems comprise, as compound A), dialkylpolysiloxanes having identical or different alkyl radicals having from 1 to 4 carbon atoms, which may be substituted or unsubstituted and contain hydroxyl or vinyl groups, preferably as end groups. In the case of the hydroxyl group, silicic esters such as tetraethyl silicate may be used as component B). In the case of vinyl groups, the component B) used may comprise platinum catalysts (RTV) or peroxides such as aroyl peroxides (bis-2,4-dichlorobenzoyl peroxide, bis-4-methylbenzoyl peroxide) and alkyl peroxides (dicumyl peroxide, 2,5-di-t-butylperoxy-2,5-dimethylhexane) (HTV). Also suitable are systems comprising an amino-functional polysiloxane as component A) and an epoxy-functional polysiloxane as component B). Further examples are dimethylpolysiloxanes as component A) and condensation catalysts such as zinc octoate or fatty acid salts of zirconium as component B).

When components A) and B) bear complementarily reactive functional groups, the two components A) and B) are preferably present in such a ratio that the molar ratio of functional groups of component A) to those of component B) is in the range from 5:1 to 1:5. Particular preference is given to equimolar ratios of the functional groups. The catalyst, when present, is used in effective amounts to perform the necessary crosslinking, generally from 0.001 to 2.0% by weight based on the functional component(s).

If appropriately functionalized copolymers have been used for each of the components A) and B), they are preferably selected so that they are compatible with one another, i.e. are miscible with one another on a molecular level. For this reason, the copolymers A) and B) present in the combination are usually chosen so that they are, apart from the functional comonomer units, predominately composed of the same comonomer units. The greatest preference is therefore given to compositions comprising carboxyl-functional styrene-n-butyl acrylate and/or styrene-methyl methacrylate-n-butyl acrylate copolymer(s) as constituent A) and styrene-n-butyl acrylate and/or styrene-methyl methacrylate-n-butyl acrylate copolymer(s) containing glycidyl methacrylate units as constituent B).

The constituents A) and B) can be employed in dry, pulverulent form (dry gluing), in the form of an aqueous dispersion or an aqueous solution (wet gluing). The constituents A) and B) can both be used as powder or both be used as aqueous solution or aqueous dispersion. It is also possible to use any combination of powders, aqueous solutions or aqueous dispersions in each of which one constituent is present. The binder constituents A) and B) are generally used separately as a 2-component system. When using pulverulent binders, the fibers may be wetted with water or an olefin wax emulsion. For this purpose, from 2 to 10% by weight of water and/or olefin wax emulsion, based on binder, may be sprayed onto the fibers or chips.

The production of medium density fiberboard (MDF) and high density fiberboard (HDF) is described in detail in Ernst Deppe, Taschenbuch der Spanplattentechnik, 3rd edition, 1991. In general, the binder composition is used in an amount of from 2 to 30% by weight, preferably in an amount of from 7 to 15% by weight, in each case based on wood particles (solid/solid).

To produce MDF fiberboard or HDF fiberboard, the wood chips are customarily conveyed via a feed hopper and a screw into the boiler of the refiner unit. There, the wood chips are softened for a few minutes, generally from 5 to 15 minutes, at a steam pressure of from 1 to 8 bar and a temperature of 120° C. to 200° C. Subsequently, the softened chips are conveyed, for example by means of a further screw, into the mill of the refiner unit, usually a disk refiner, where the wood chips are broken up into fibers between milling disks. For the treatment with the binder, the fibers are conveyed after milling, still under steam pressure at a temperature of from 120° C. to 150° C., into the blow-line of the refiner unit. After the blow-line, the fibers are directed into a dryer, for example a tube dryer, and are subsequently sprinkled uniformly by means of a sprinkling machine onto a molding belt and, if desired, subjected to preliminary cold pressing. The fiber layer is finally pressed by means of hot platens at temperatures of from 150° C. to 250° C. and under a pressure of from 10 to 100 bar to form boards.

The treatment with binder is carried out by means of separate addition of the two components of the two-component system. The more thermally stable component A) of the system employed is introduced into the refiner unit before the mill, in the mill, or shortly after the mill in the front section, preferably in the first third, of the blow-line. The second constituent, namely the crosslinker component B) or the component B) which brings about crosslinking, is introduced in a later stage of the process. This can be carried out at the end of the blow-line of the refiner unit, preferably in the last third of the blow-line, during drying of the fibers in the drying tube, or after drying of the fibers. The advantage of this process is that the crosslinker component B) is added in a process step in which thermal stress is lower and thus much less premature crosslinking occurs.

EXAMPLES

Comparative Example C1

Spruce chips were boiled in a refiner at 5 bar and 147° C. for 5 minutes and milled at a milling disk spacing of 0.1 mm and a power input of about 20 kW. The fibers were dried to a residual moisture content of 2% without application of binder and were stored in intermediate storage without compaction.

In a Lödige ploughshare mixer provided with a multistage knife head, 755 g of milled fibers were uniformly mixed with 112 g (=15% by weight, solid/solid) of pulverulent phenol-formaldehyde resin (PF). To improve adhesion of the powder, 5% by weight of water were introduced into the Lödige mixer. The binder-coated fibers were sprinkled uniformly by hand into a 50×50×40 cm (L×W×H) frame and compacted at room temperature. This mat was taken from the frame and placed in a platen press and pressed to the intended thickness of 3 mm at a pressure of up to 50 bar for 180 sec at 200° C. The hot board was placed in an insulated box and kept warm for 12 hours to complete the crosslinking reaction, subsequently cut up as appropriate and subjected to testing.

Comparative Example C2

A fiberboard was prepared analogously to Comparative Example C1, except that the binder used was 15% by weight (solid/solid) of a powder mixture of a styrene-butyl acrylate-acrylic acid copolymer having a Tg of >50° C. and a styrene-butyl acrylate-glycidyl methacrylate copolymer having a Tg of >50° C., with no 12 hour storage prior to testing.

Comparative Example C3

Spruce chips were boiled at 5 bar at 147° C. for 5 minutes in a refiner and milled at a milling disk spacing of 0.1 mm and a power input of about 20 kW. Shortly after the mill, in the first third of the blow-line a mixture of aqueous dispersions of a styrene-butyl acrylate-acrylic acid copolymer having a Tg of >50° C. and a styrene-butyl acrylate-glycidyl methacrylate copolymer having a Tg of >50° C., each having a solids content of 50%, were added in an amount of 15% by weight (solid/solid). The fibers which had been treated with binder were subsequently dried to a residual moisture content of 2% and stored in intermediate storage without compaction. The treated fibers were then sprinkled uniformly by hand into a 50×50×40 cm frame and compacted at room temperature. The resulting mat was taken from the frame and placed in a platen press and pressed to the intended thickness of 3 mm at a pressure of up to 50 bar for 180 sec at 200° C. The board was subsequently cut up as appropriate and subjected to testing.

Example 4

Spruce chips were boiled at 5 bar at 147° C. for 5 minutes in a refiner and milled at a milling disk spacing of 0.1 mm and a power input of about 20 kW. Shortly after the mill, an aqueous dispersion of a styrene-butyl acrylate-acrylic acid copolymer having a Tg of >50° C. in an amount of 9% by weight (solid/solid) was added. The fibers which had been treated with binder were subsequently dried to a residual moisture content of 2% and the dried fibers were mixed with 6% by weight of pulverulent styrene-butyl acrylate-glycidyl methacrylate copolymer having a Tg of >50° C. in a Lödige ploughshare mixer with multistage knife head. The fibers which had been treated with binder were sprinkled uniformly by hand into a 50×50×40 cm frame and compacted at room temperature. The resulting mat was taken from the frame and placed in a platen press and pressed to the intended thickness of 3 mm at a pressure of up to 50 bar for 180 sec at 200° C. The board was subsequently cut up as appropriate and subjected to testing.

Testing:

The transverse tensile strength in accordance with EN 319, the flexural strength in accordance with DIN 52 362, and the thickness swelling after 2 hours and 24 hours in accordance with DIN 52 364, were measured on the particleboards produced. The results of the measurements are summarized in Table 1 below.

Comparative Example C1 displays high transverse tensile strength and flexural strength, and low water swelling. Since the phenol-formaldehyde resin was not added in the refiner, but at room temperature to dry fibers, the full crosslinking capacity was available during pressing. A disadvantage of the process of Comparative Example C1 is the long subsequent thermal treatment to allow the crosslinking reaction to proceed to completion. A further disadvantage is the high splintering tendency of the fiber boards due to the high degree of crosslinking and the low flexibility of the resin. This is particularly undesirable in applications in the automobile sector because of the danger of injury in the case of accidents. The board was yellow-brown in color and had a distinct unpleasant odor.

The fiberboard of Comparative Example C2 exhibited similar strength and swelling values as that of Comparative Example C1. A particularly conspicuous feature is the bending of over 29 mm in the flexural test without fracture of the board occurring. Since the binder was added after drying of the fibers, the full crosslinking capacity is available.

Comparative Example 3 was carried out using the same resin as in Comparative Example C2, but by means of wet gluing in place of dry gluing. In the wet gluing procedure, the resin is generally distributed more uniformly over the fiber surface due to the greater turbulence and the long mixing section. Stronger binding of the fibers in the fiberboard is therefore to be expected. However, comparison of the property values shows that the wet gluing is slightly weaker than the dry gluing. The cause of this loss of binding power is that partial crosslinking occurs in the refiner. On pressing, the resin then displays poorer flow and can no longer bind as well.

The fiberboard of Example 4 exhibited the best strengths. Here, only one component, one having thermally stable functional groups, was introduced in the wet gluing step and an optimum binder distribution was achieved. The second component, having crosslinkable, thermally unstable groups, is added in a dry gluing step with brief and low thermal stressing. Thus, the full crosslinking capacity is available in the pressing step.

TABLE

| Example | Transverse tensile strength N/mm$^2$ | Flexural strength N/mm$^2$ | E modulus in flexure | Swelling 2 h | Swelling 24 h |
|---|---|---|---|---|---|
| C. Ex. C1 | 1.37 | 60.3 | 6226 | 4 | 12 |
| C. Ex. C2 | 1.01 | 48.0 | 5021 | 6 | 16 |
| C. Ex. C3 | 0.95 | 43.6 | 4772 | 13 | 29 |
| Ex. 4 | 1.93 | 56.4 | 5177 | 8 | 21 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless specified otherwise. In the claims, use of the singular implies the plural and use of the plural implies the singular when referring to a class of monomers, comonomers, or polymers.

What is claimed is:

1. In a process for producing wood fiberboard by pressing binder-treated wood wherein the wood fibers are hydrothermally treated and milled at elevated temperature under steam pressure in a refiner unit, subsequently transferred to a blow-line, then dried and pressed under pressure, optionally at elevated temperature, to produce boards, the improvement comprising:

selecting as said binder a multi-component binder, and treating the wood fibers in the refiner with a first component of said multi-component binder, at a temperature of 120° C. to 200° C., said treating taking place prior to the milling step, during the milling step, or shortly after the milling step in the front section of the blow-line, said first component being substantially non-reactive during said treating of said wood fibers, and adding at least a second component of said multi-component binder at a lower temperature of not more than 150° C. at the end of the blow-line or during or after the drying of the wood fibers.

2. In the process of claim 1 for producing wood fiberboard by pressing wood fibers which have been treated with binder, in which the wood fibers are hydrothermally treated and milled at elevated temperature under steam pressure in a refiner unit, subsequently transferred to a blow-line, then dried and pressed under pressure, optionally at elevated temperature, to produce boards, the improvement comprising:

treating the wood fibers with a two-component binder, a first component A) containing functional groups which are nonreactive at elevated temperature and a second component B) containing functional groups which are reactive at elevated temperature, the component A) added in the refiner unit at a temperature of from 120° C. to 200° C. prior to the milling step during the milling step, or shortly after the milling step in the front section of the blow-line, and component B) added at a lower temperature of not more than 150° C. at the end of the blow-line or during or after the drying of the wood fibers.

3. The process of claim 2, wherein component A) is a copolymer comprising one or more base comonomer units selected from the group consisting of vinyl esters of unbranched or branched alkylcarboxylic acids having from 1 to 18 carbon atoms, acrylic esters of branched or unbranched alcohols having from 1 to 15 carbon atoms, methacrylic esters of branched or unbranched alcohols having from 1 to 15 carbon atoms, dienes, olefins, vinylaromatics and vinyl halides, and from 0.1 to 50% by weight, based on the total weight of the copolymer, of one or more functional comonomer units containing carboxyl, hydroxy, or NH groups.

4. The process of claim 3, wherein copolymer A) comprises comonomer units obtained by copolymerization of the base comonomer units with ethylenically unsaturated monocarboxylic or dicarboxylic acids and/or with maleic anhydride as carboxyl-functional comonomer units, by copolymerization with hydroxyalkyl acrylates and/or hydroxyalkyl methacrylates having a $C_1$–$C_8$-alkyl radical as hydroxy-functional comonomer units, or by copolymerization with one or more comonomers selected from the group consisting of (meth)acrylamide, diacetoneacrylamide, maleimide, amides of monoalkyl maleates, amides of monoalkyl fumarates, diamides of maleic acid, diamides of fumaric acid, amides of monovinyl glutarate, amides of monovinyl succinate, amides of monoallyl glutarate, and amides of monoalkyl succinate as NH functional comonomers, or wherein NH functionality is added as amino-functional oligomers containing primary or secondary NH groups to the copolymer A).

5. The process of claim 2, wherein component B) comprises at least one crosslinker selected from the group consisting of bisphenol A epoxy resins, diisocyanate(s), oligoisocyanate(s), polyisocyanate(s), compounds containing two or more groups selected from the group consisting of aldehyde, keto and reactive CH groups, compounds containing a plurality of a aziridine, carbodiimide or oxazoline groups, and mixtures thereof.

6. The process of claim 2, wherein copolymers containing moieties derived from epoxy, N-methylol, ethylene carbonate or isocyanate group-containing functional monomers or combinations of these functional monomers together with moieties derived from non-functional comonomers are used as crosslinker B), and wherein the non-functional comonomers used to prepare component B) comprise substantially the same comonomers used as base monomers for copolymer A.

7. The process of claim 2, wherein diamines, oligoamines, polyamines or polyalkyleneamines, compounds containing two or more OH groups, or polyvalent metal ions are used as component B) in combination with carboxyl-functional copolymer(s) A.

8. The process of claim 2, wherein compounds containing two or more silanol or alkoxysilane groups in monomeric or condensed form, or polyvalent metal ions, are used as crosslinker B) in combination with hydroxy-functional copolymers A).

9. The process of claim 2, wherein at least one of dicarboxylic, oligocarboxylic or polycarboxylic acids are used as crosslinker B) in combination with NH-functional copolymers A).

10. The process of claim 2, wherein component B) is added together with a crosslinking catalyst.

11. The process of claim 2, wherein carboxyl-functional copolymers are used as component A) and component B) comprises a catalyst which catalyzes reaction of the carboxyl groups of component A) with OH groups of the cellulose of the wood fibers.

12. The process of claim 2, wherein diamines, oligoamines and/or polyamines comprise component A) and diisocyanates comprise component B).

13. The process of claim 1, wherein tin catalysts are used as component A), in combination with diisocyanates, oligoisocyanates or polyisocyanates or dicarboxylic, oligocarboxylic or polycarboxylic acids as component B).

14. The process of claim 1, wherein dialkylpolysiloxanes having identical or different alkyl radicals having from 1 to 4 carbon atoms and containing hydroxyl or vinyl functional groups are used as component A), and silicic esters are used as component B) in the case of hydroxyl end group-containing component A), or platinum catalysts or peroxides are used as component B) in the case of the vinyl end group-containing component A).

15. The process of claim 1, wherein an amino-functional polysiloxane is used as component A) and an epoxy-functional polysiloxane is used as component B), or dimethylpolysiloxanes are used as component A) and condensation catalysts are used as component B).

16. The process of claim 1, wherein component A) is added in the refiner unit before the mill, in the mill, or shortly after the mill in the first third of the blow-line, and component B) is added in the last third of the blow-line of the refiner unit, during drying of the fibers in the drying tube, or after drying of the fibers.

17. The process of claim 1, wherein said component B) comprises a catalytically crosslinkable composition, and component A) comprises a catalyst in an amount effective to crosslink component B) during pressing at elevated temperature.

18. The process of claim 1, wherein said component A) comprises a catalytically crosslinkable composition, and component B) comprises a catalyst in an amount effective to crosslink component A) during pressing at elevated temperature.

19. The process of claim 2 wherein one of component A) or component B) or both component A) and component B) contains a catalyst which catalyzes the crosslinking of the functional groups of component A) with the functional groups of component B).

* * * * *